United States Patent
Ho et al.

(10) Patent No.: US 11,960,281 B1
(45) Date of Patent: Apr. 16, 2024

(54) RESOURCE SHARING AMONG AUTONOMOUS DEVICES

(71) Applicants: Chi Fai Ho, Palo Alto, CA (US); Benson Junwun Ho, Palo Alto, CA (US)

(72) Inventors: Chi Fai Ho, Palo Alto, CA (US); Benson Junwun Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 216 days.

(21) Appl. No.: 16/711,473

(22) Filed: Dec. 12, 2019

(51) Int. Cl.
*G05D 1/00* (2006.01)
*G05D 1/02* (2020.01)

(52) U.S. Cl.
CPC ......... *G05D 1/0088* (2013.01); *G05D 1/0287* (2013.01)

(58) Field of Classification Search
CPC .............. G05D 1/0088; G05D 1/0287; G05D 2201/0212; B60W 10/00–50/16; B60W 60/005–60/0061; B60W 2300/00–2530/213; B60W 2540/041–2540/049; B60W 2552/00–2556/65
See application file for complete search history.

(56) References Cited

U.S. PATENT DOCUMENTS

| | | | | |
|---|---|---|---|---|
| 9,046,892 B2* | 6/2015 | Jang | ............ | G06Q 10/0631 |
| 9,120,622 B1* | 9/2015 | Elazary | ............ | B25J 9/1697 |
| 9,513,627 B1* | 12/2016 | Elazary | ............ | G05B 19/41895 |
| 9,671,791 B1* | 6/2017 | Paczan | ............ | G05D 1/0088 |
| 10,235,642 B2* | 3/2019 | Kattepur | ............ | G05D 1/0217 |
| 10,324,455 B2* | 6/2019 | Elazary | ............ | G05B 19/41865 |
| 10,792,813 B1* | 10/2020 | Coe | ............ | G06F 9/5038 |
| 2006/0155406 A1* | 7/2006 | Rossi | ............ | G05B 19/41865 700/99 |
| 2012/0330540 A1* | 12/2012 | Ozaki | ............ | G08G 1/096816 701/117 |

(Continued)

OTHER PUBLICATIONS

Fagernes et al., Resource-sharing among autonomous agents, Oct. 20, 2018, Springer-Verlag London Ltd. (Year: 2018).*

(Continued)

*Primary Examiner* — Jason Holloway
*Assistant Examiner* — Blake A Wood
(74) *Attorney, Agent, or Firm* — Sunstein LLP

(57) ABSTRACT

In resource sharing by autonomous devices in an environment, first and second autonomous devices send first and second reservation requests, respectively, to a reservation controller for access to a resource in the environment required to perform first and second tasks. The first and second reservation requests include first and second requested utilizations, respectively, for usage of the resource. The first autonomous device receives a first permit with a first granted utilization, and the second autonomous device receives a second permit with a second granted utilization, for usage of the resource. Using the resource, the first autonomous device performs the first task according to the first granted utilization, and the second autonomous device performs the second task according to second granted utilization, where second granted utilization does not conflict with the first granted utilization.

51 Claims, 9 Drawing Sheets

(56) References Cited

U.S. PATENT DOCUMENTS

| | | | | |
|---|---|---|---|---|
| 2013/0046525 A1* | 2/2013 | Ali | ............... | A01B 79/005 |
| | | | | 703/6 |
| 2016/0129592 A1* | 5/2016 | Saboo | ............... | B25J 9/1661 |
| | | | | 700/248 |
| 2017/0278406 A1* | 9/2017 | Akselrod | ............... | G08G 5/0091 |
| 2017/0308070 A1* | 10/2017 | Elazary | ............... | G05D 1/0289 |
| 2017/0308096 A1* | 10/2017 | Nusser | ............... | G05D 1/0287 |
| 2018/0178382 A1* | 6/2018 | Lalonde | ............... | G05D 1/0297 |
| 2018/0239343 A1* | 8/2018 | Voorhies | ............... | G05D 1/0289 |
| 2018/0299882 A1* | 10/2018 | Kichkaylo | ............... | G05D 1/0274 |
| 2019/0130515 A1* | 5/2019 | Haggiag | ............... | G06Q 10/06311 |
| 2021/0160739 A1* | 5/2021 | Tonnerre | ............... | H04W 28/26 |

OTHER PUBLICATIONS

Wang et al., Resource sharing in distributed robotic systems based on a wireless medium access protocol (CSMA/CD-W), 1996, Elsevier Science (Year: 1996).*

* cited by examiner

Resource 331

- Physical space
- Shared physical instrument
- Shared geographic location
- State of a space
- Communication medium

FIG. 4

Sharing Policy 371

- Autonomous Device Priority
- Task Priority
- Scheduling Policy
  - Time Utilization
  - Deadline
  - Capacity Utilization
- Network Partitioning Policy
- Resource Partitioning Policy

FIG. 6

RESOURCE SHARING AMONG AUTONOMOUS DEVICES

BACKGROUND OF THE INVENTION

This invention relates generally to a resource reservation controller, and more specifically, to a plurality of autonomous devices sharing a resource through a resource reservation controller.

RELATED ART

With advances in artificial intelligence processing capabilities and memory resources for connected computing devices, one can deploy advanced artificial intelligence processing into autonomous computing devices. Smart Internet of Things (IOT) devices, self-driving cars, robots, drones are made available for consumers and businesses. These autonomous devices are able to gather data about its environment and use the data it collects to make calculations, define probabilities, and make reason-based decisions concerning a next processing path. A drone detects an area to be a No Fly Zone and flies around the zone. A robot senses uneven ground and decides to jump over the hurdle. A self-driving car sees a toll booth and drives through the toll booth while paying the toll electronically. A security camera captures a stream of images, detects a person other than an employee, and sends a video footage of the person to a network security system for further identification. The security camera may alert other security cameras to monitor the person. These autonomous devices make decision based on current states and data collected regarding the environment, and execute processes that also affect the environment and current states.

Unaware to an autonomous device, its action affecting the environment and states can affect another autonomous device sharing the same environment. Two or more autonomous devices sharing the environment may decide on different actions that conflict with each other, or even harm one or the other autonomous device. In one scenario, a drone selects a flight path avoids a No Fly Zone, but overlaps the flight path of another drone, causing a potential for a collision. In another scenario, a self-driving car drives through a toll booth. Another self-driving car senses the first car driving through the toll booth and waits for its turn. In the meantime, another self-driving car behind the first car senses the toll booth as being available and drives through the booth. The waiting car may need to wait for a long time before it can pass through the booth. In yet another scenario, a security camera continuously transmits video images, using up a significant portion of the available network communication bandwidth. Another security camera configured to send an urgent video of an intruding person cannot transmit the video immediately as it cannot obtain sufficient bandwidth. In yet another scenario, a smart sprinkler decides to water the vegetation as the soil is dry, but is unaware of a nearby robot attempting to dig in the soil to plant vegetation.

A "resource", as used herein, includes, but is not limited to, any naturally occurring or man-made physical space, object, device instrument, component, or medium. An "environment", as used herein, refers to a group of resources shared by a plurality of autonomous devices.

One approach is for the plurality of autonomous devices to communicate with each other and coordinate the sharing of the resources among themselves. However, when the plurality of autonomous devices is not configured to communicate in this manner, operate independently of each other, or are otherwise unaware of the actions of the others, such coordination is not possible.

This invention proposes a resource reservation system to assist a plurality of autonomous devices sharing a resource in an environment to reserve the resource prior to performing tasks using the resource.

BRIEF SUMMARY OF THE INVENTION

Disclosed herein is a method for resource sharing by a plurality of autonomous devices in an environment, and a corresponding system and a computer program product as specified in the independent claims. Embodiments of the present invention are given in the dependent claims. Embodiments of the present invention can be freely combined with each other if they are not mutually exclusive.

According to one embodiment of the present invention, in resource sharing by a plurality of autonomous devices in an environment, a first autonomous device sends to a reservation controller a first reservation request for access to a resource in the environment required to perform a first task, where the first reservation request includes a first requested utilization for usage of the resource. The first autonomous device receives from the reservation controller a first permit for access to the resource, where the first permit includes a first granted utilization for usage of the resource by the first autonomous device. The first autonomous device performs the first task using the resource according to the first granted utilization.

In one aspect of the present invention, a second autonomous device of the plurality of autonomous devices sends to the reservation controller a second reservation request for access to the resource required to perform a second task, where the second reservation request includes a second requested utilization for usage of the resource by the second autonomous device. The second autonomous device receives from the reservation controller a second permit for access to the resource, where the second permit includes a second granted utilization for usage of the resource by the second autonomous device. The second autonomous device performs the second task using the resource according to the second granted utilization.

In one aspect of the present invention, the second granted utilization is different from the first granted utilization, where the second granted utilization does not conflict with the first granted utilization.

In one aspect of the present invention, the first requested utilization is different from the first granted utilization.

In one aspect of the present invention, the first autonomous device includes one or more first sensors, and the second autonomous device includes one or more second sensors. The one or more first sensors capture a first plurality of data from the environment, and the one or more second sensors capture a second plurality of data from the environment. The resource includes a transmission medium for data communication, where the first task and the second task include use of the transmission medium. The first autonomous device accesses the transmission medium and sends the first plurality of data to a first network computing device over the transmission medium according to the first granted utilization, and the second autonomous device accesses the transmission medium and sends the second plurality of data to a second network computing device over the transmission medium according to the second granted utilization.

In one aspect of the present invention, the first autonomous device includes a first motor, and the second autonomous device includes a second motor. The resource includes a physical object residing in the environment, where the first task and the second task include interfacing with the physical object. The first autonomous device interfaces with the physical object using the first motor according to the first granted utilization, the second autonomous device interfaces with the physical object using the second motor according to the second granted utilization.

In one aspect of the present invention, the first autonomous device includes a first motor, and the second autonomous device includes a second motor. The resource includes a physical space within the environment, where the first task and the second task include navigation within the physical space. The first autonomous device navigates within the physical space using the first motor according to the first granted utilization, and the second autonomous device navigates within the physical space using the second motor according to the second granted utilization.

In one aspect of the present invention, the first autonomous device includes a first control unit, and the second autonomous device includes a control unit. The resource includes a physical device residing within the environment, where the first task and the second task include operation of the physical device. The first control unit of the first autonomous device operates the physical device according to the first granted utilization, and the second control unit of the second autonomous device operates the physical device according to the second granted utilization.

BRIEF DESCRIPTION OF THE SEVERAL VIEWS OF THE FIGURES

FIG. 4 illustrates embodiment of a resource needed by an autonomous device.

FIG. 6 illustrates exemplary embodiments of resource sharing policy.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
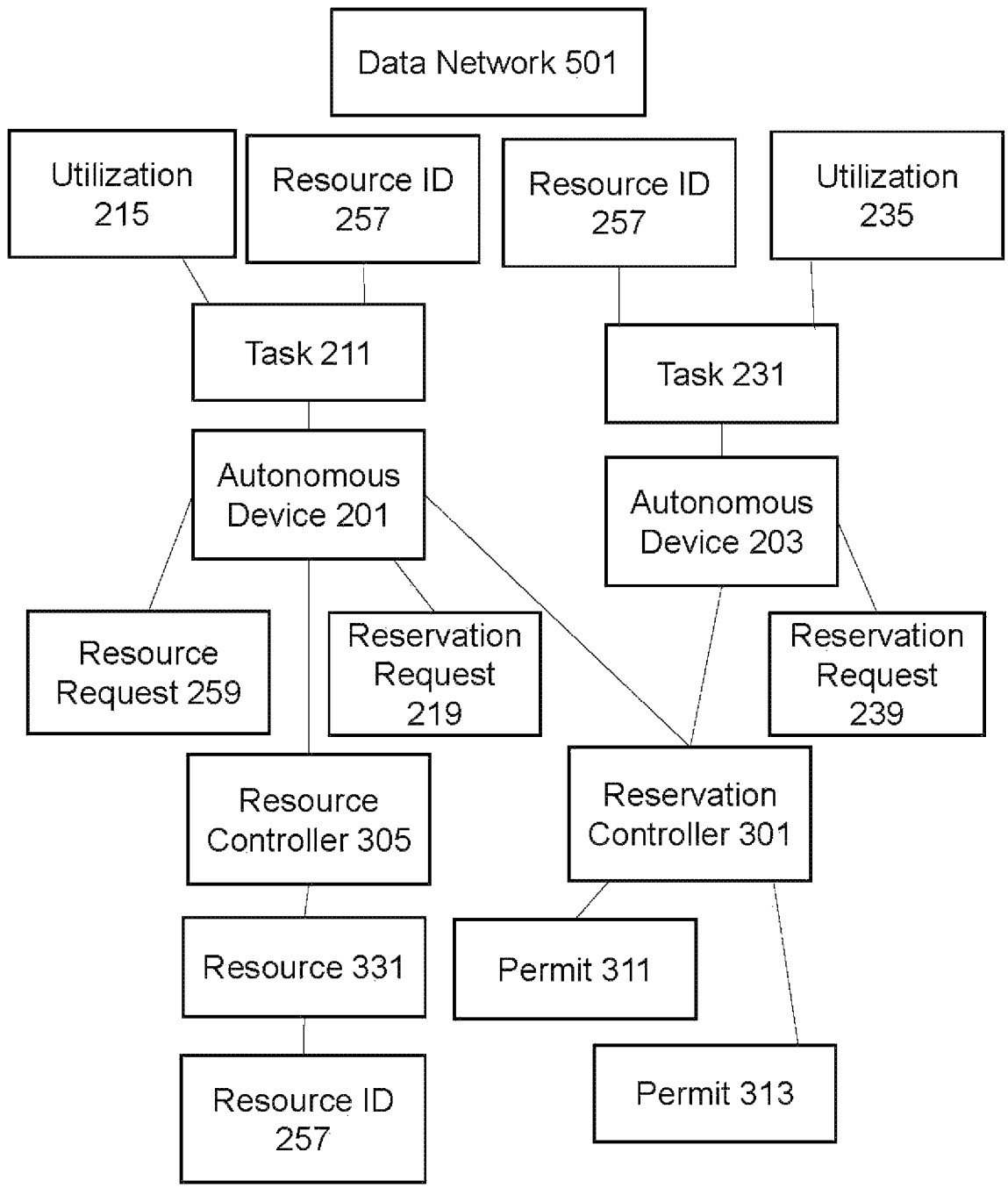
FIG. 1 illustrates an exemplary embodiment of a process to share a resource among a plurality of autonomous devices.

FIG. 1 illustrates an exemplary embodiment of a process to share a resource among a plurality of autonomous devices in an environment. In one embodiment, a plurality of autonomous devices such as autonomous device 201 and autonomous device 203 share a resource 331 in order to perform task 211 and task 231 respectively. The autonomous devices 201 and 203 function within the environment independently of each other, without communication, or are otherwise unaware of the actions of the other. In one embodiment, autonomous device 201 performs task 211 and determines task 211 requires resource 331. Autonomous device 201 obtains a resource identity 257 of resource 331 and sends a resource reservation request 219 to reservation controller 301 over data network 501, in order to reserve a temporarily usage of resource 331. In one embodiment, autonomous device 201 includes in reservation request 219 resource identity 257, and an identity of task 211 (task identity), an identity of autonomous device 201 (autonomous device identity), and a utilization 215 regarding a usage of resource 331 required by autonomous device 201.

In one embodiment, autonomous device 203 sends a reservation request 239 to reserve a temporarily usage of resource 331 in order to perform task 231. Reservation request 239 includes resource identity 257 of resource 331, an identity of autonomous device 203, an identity of task 231, and a utilization 235 regarding usage of resource 331 required by autonomous device 203.

A utilization 215 or 235 defines a manner in which a resource is to be handled, manipulated, altered, or otherwise used in order for an autonomous device to be able to perform a task, by the autonomous device during the performance of a task, or by the autonomous device as a result of performing the task.

In one embodiment, reservation controller 301 receives reservation request 219, processes reservation request 219, generates a permit 311, and sends permit 311 to autonomous device 201 for usage of resource 331. Reservation controller 301 may include in the permit 311 a granted utilization which is the same as the requested utilization 215 in the reservation request 219 or is modified or different form the requested utilization 215. In one embodiment, reservation controller 301 further receives reservation request 239 and processes reservation request 239 in consideration of permit 311 or reservation request 219. In one embodiment, reservation controller 301 accepts reservation request 239, generates a permit 313, and sends permit 313 to autonomous device 203. In one embodiment, reservation controller 301 rejects reservation request 239 in view of permit 311 or reservation request 219 and sends a rejection to autonomous device 203.

In one embodiment, autonomous device 201 receives permit 311, allowing autonomous device 201 to perform task 211. Autonomous device 201 proceeds to perform task 211. In one embodiment, autonomous device 201 proceeds to access or use resource 331, as permitted by permit 311. In one embodiment, autonomous device 201 sends a resource request 259 to a resource controller 305 to access resource 331, via data network 501. Resource request 259 includes permit 311, indicating an approval or permission of usage of resource 331. In one embodiment, permit 311 or resource request 259 may include one or more of an identity of autonomous device 201, resource identity 257, an identity of task 211, and a utilization 215 as granted by the reservation controller 301. In response to receipt of the resource request 259, resource controller 305 retrieves permit 311 and the resource identity 257 from resource request 259, obtains resource 331 based on resource identity 257, and sends resource 331 to autonomous device 201. In one embodiment, resource controller 305 allocates resource 331 based on received utilization 215 and informs autonomous device 201 of the allocated resource 331.

In one embodiment, resource controller 305 determines if permit 311 is valid. In one embodiment, resource controller 305 queries reservation controller 301 if permit 311 is valid. In one embodiment, resource controller 305 determines that permit 311 is valid and proceeds to obtain or allocate resource 331. In one embodiment, resource controller 305 determines that permit 311 is invalid and rejects resource request 259.

In one embodiment, autonomous device 201 receives resource 331 from resource controller 305, and proceeds to perform task 211 using resource 331. In one embodiment, autonomous device 201 receives a rejection from resource controller 305, and does not perform task 211.

Figure 2:
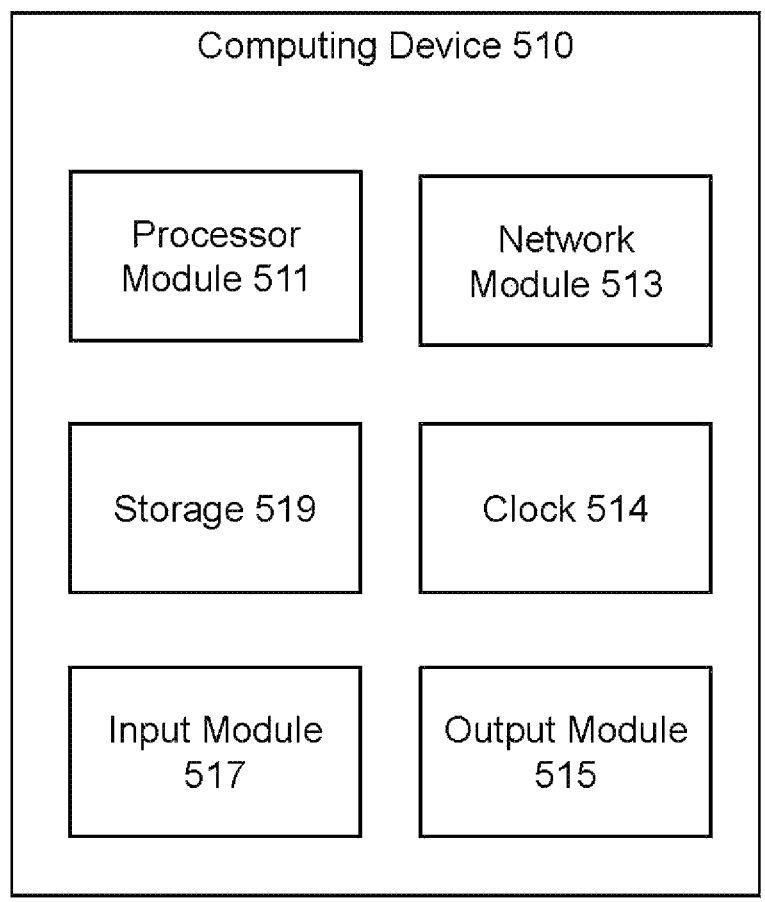
FIG. 2 illustrates an embodiment of a computing device.

FIG. 2 illustrates an exemplary embodiment of hardware components of a computing device which can be used for an autonomous device or a controller. In one embodiment, computing device 510 includes a processor module 511, an output module 515, an input module 517, and a storage module 519. In one embodiment, computing device 510 may include a network module 513 or a clock 514. In one embodiment, processor module 511 includes one or more general processors, a multi-core processor, an application specific integrated circuit based processor, a system on a chip (SOC) processor or an embedded processor. In one embodiment, output module 515 includes or connects to a display for displaying video signals, images and text, and an audio speaker to play sound signals. In one embodiment, output module 515 includes a data interface such as USB, HDMI, DVI, DisplayPort, thunderbolt or a wire-cable connecting to a display or a speaker. In one embodiment, output module 515 connects to a display or a speaker using a wireless connection or a wireless data network. In one embodiment, input module 517 includes a physical or logical keyboard, buttons, keys, or microphones. In one embodiment, input module 517 connects to one or more sensors such as a camera sensor, an optical sensor, a night-vision sensor, an infrared (IR) sensor, a motion sensor, a direction sensor, a proximity sensor, a gesture sensor, or other sensors that is usable by a user to provide input to computing device 510. In one embodiment, input module 517 includes a physical panel housing one or more sensors. In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a wireless data network such as a cellular network, a mobile network, a Bluetooth network, an NFC network, a personal area network (PAN), a WiFi network, or a LiFi network.

Storage 519 includes executable instructions when read and executed by the processor module 511 of computing device 510 implement one or more functionality of the current invention. In one embodiment, storage 519 stores images, pictures, data associated to the stored images or pictures, one or more attributes associated to one or more sensors connected to computing device 510. In one embodiment, storage 519 stores a plurality of computer programming instructions to be executed by processor module 511.

Figure 3:
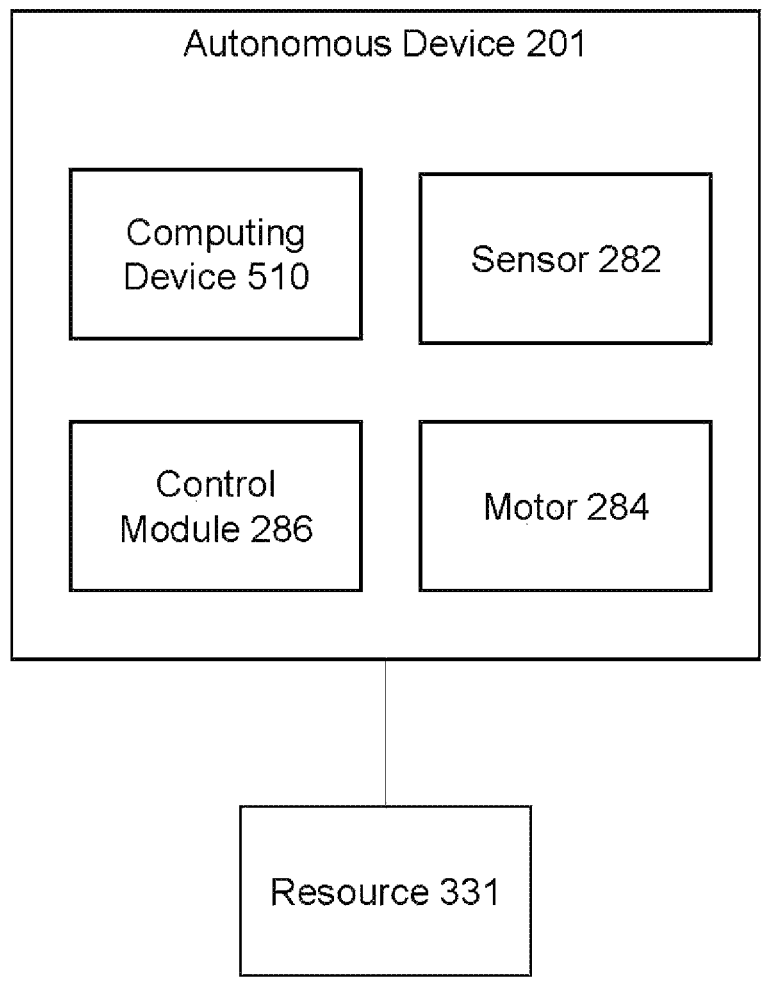
FIG. 3 illustrates an embodiment of an autonomous device.

FIG. 3 illustrates an embodiment of an autonomous device. In one embodiment, autonomous device 201 includes a computing device 510 as illustrated in FIG. 2. In one embodiment, autonomous device 201 includes one or more of a sensor 282, a motor 284, and a control module 286. Sensor 282, motor 284 or control module 286 are connected to computing device 510. In one embodiment, autonomous device 201 requires resource 331 in order to operate sensor 282, control module 286 or motor 284. In one embodiment, resource 331 is also required by one or more other autonomous devices for their proper operation.

In one embodiment, sensor 282 captures a plurality of data and the captured data requires resource 331, such as a transmission medium for data communication to transmit the captured data to a network computing device for processing. In this embodiment, resource 331 may include a wireless spectrum for communication. In one embodiment, autonomous device 201 includes a temperature or moisture sensor 282 continuously capturing the temperature or humidity of an area where autonomous device 201 operates, and autonomous device 201 sends the captured temperature data to a remote computing device for analysis. In one embodiment, autonomous device 201 includes a chemical sensor 282, such as carbon dioxide sensor, carbon monoxide sensor, electrochemical gas sensor, or other sensor sensing existence of a chemical compound, continuously detecting the existence or one or more chemical compounds of a certain classification in the area where autonomous device 201 operates, and autonomous device 201 sends the captured sensing data to a remote computing device for analysis. In one embodiment, autonomous device 201 includes an imaging sensor 282, such as a camera, an infra-red sensor, an iris scanner, or an ultrasonic sensor, continuously capturing images of the area around sensor 282, and autonomous device 201 sends the captured images to a remote computing device for processing. In one embodiment, sensor 282 includes a light sensor, a sound sensor or a motion sensor, a vibration sensor, a moisture sensor, a sensor related to an equipment, or other types of sensor continuously capturing data where the captured data are to be sent to a network computing device for processing.

In one embodiment, motor 284 may require a space for locomotion or movement, or a physical equipment for operation. In one embodiment, autonomous device 201 is a drone or an unmanned aerial vehicle capable of executing navigation decisions without human input, and motor 284 includes a propeller blade, a jet engine, or a jet propeller. Autonomous device 201 requires resource 331, such as a launch pad, a landing pad, a runway for flying or landing, a platform, or a large enough air space above ground in order to take off or to land. In one embodiment, a large number of delivery autonomous aviating drones share a small number of launch pads and landing pads in a delivery center. In one embodiment, the delivery center resides in a densely populated space in a city where space is too limited or expensive to have one launch pad per delivery drone. In order to share a limited number of launch and landing pads, the delivery drones need to acquire permission to take off or to land. In one embodiment, permission for the delivery drones to use a launch pad to take off may depend on the priority of the packages being delivered by the drone, the drone type and size, or drone priority. In one embodiment, permission for the delivery drone to use a landing pad to land may depend on the remaining fuel of the drone, where drones with lesser remaining fuel has priority over drones with larger remaining fuel.

In one embodiment, autonomous device 201 is an unmanned driving vehicle or a robot capable of executing movement without human control, and motor 284 includes one or more wheels, a moving belt, or one or more mechanical legs. Autonomous device 201 requires resource 331 such as a lane in a road space, a parking space, or an entrance gate in order to operate motor 284. In one embodiment, a plurality of delivery autonomous vehicles parked in a delivery center share a parking lot, gates, and roads leading to and leaving from the delivery center.

In one embodiment, control unit 286 controls a separate physical device in the environment that can change the environment around the physical device. Control unit 286 may control an air conditioning system or a heating system that can change the temperature, a lighting system that can change the lights, or a power or electricity system that provides electricity to an area. Control unit 286 may control a water pool, an oven, an industrial equipment, or a building door, a garage gate, or other equipment. In one embodiment, control unit 286 may require additional resources such as power, water, chemicals, or components in order to operate the physical device. In one embodiment, autonomous device 201 is required to obtain permission to use control unit 286 to operate the physical device, or to use the resources required for control unit 286 to operate the physical device. In one embodiment, autonomous device 201 and other autonomous devices are to turn on their corresponding controlling physical devices at different times according to the corresponding permits so that the autonomous devices do not turn on the physical devices at the same time, creating the potential for a sudden power surge.

Returning to FIG. 1, resource 331 includes a resource needed by both autonomous device 201 and autonomous device 203 to perform their respective tasks. FIG. 4 illustrates exemplary embodiments of resource 331. In one embodiment, resource 331 includes physical space, such as air space, open space, a road, an entrance gate, a landing pad, a launching pad, an elevator, or a stairway, for autonomous device 201 to fly or to move from one location to another location. In one embodiment, resource 331 includes a shared physical instrument such as a screw driver, a heating equipment, or an industrial equipment in order for autonomous device 201 to perform a task. In one embodiment, resource 331 includes a shared geographic location, such as an office, or a state of the geographic location, such as a temperature of a room, for autonomous device 201 which is required to operate a control module. In one embodiment, resource 331 includes a shared communication medium such as wireless communication channels, a network switch, or an optical communication medium for autonomous device 201 to transfer critical data or a large amount of data.

In one embodiment, resource identity 257 includes a numeric identity, a name, an alpha-numeral identifying resource 331. In one embodiment, resource identity 257 includes a sub-identity to indicate a portion or a sub-component of resource 331. In one embodiment, resource identity 257 includes a description of resource 331.

In one embodiment, utilization 215 includes a time duration, a schedule, or a deadline for when resource 331 can be accessed. In one embodiment, utilization 215 indicates a time duration of 20 seconds, 10 minutes, 1 second, or 3 hour of usage. In one embodiment, utilization 215 includes a schedule of immediately, or between 5 am today to 9 pm tomorrow. In one embodiment, utilization 215 includes a deadline of 1 hour, 10 minutes or 1 day. In one embodiment, utilization 215 includes a capacity, such as 1 GB of data, 20 MB of data, 1 ton of weight, or 4 parts of resource 331. In one embodiment, utilization 215 includes a priority, such as high priority, low priority, or priority 4.

In one embodiment, task 211 includes a plurality of computing programming instructions, stored in a storage module of autonomous device 201, allowing autonomous device 201 to access resource 331 in order to achieve an object of autonomous device 201. In one embodiment, task 211 includes an unmanned (aerial) vehicle as autonomous device 201 achieving flight using one or more propeller blades, or a propeller engine. In one embodiment, task 211 includes a self-driving vehicle or robot as autonomous device 201 achieving movement on a road or the ground using wheels or mechanical legs. In one embodiment, task 211 includes transferring captured sensing data over a wireless network to a remote computing device by the autonomous device 201 having a sensor. In one embodiment, task 211 includes a smart air quality controller as autonomous device 201 controlling the temperature, humidity, dust, smell or other air quality attributes of a room, an office, a facility or a building.

In one embodiment, reservation controller 301 is a computing device 510 as illustrated in FIG. 2. In one embodiment, reservation controller 301 resides in a data center, a network cloud, or in a premises co-located with autonomous device 201. In one embodiment, reservation controller 301 includes a server computer or a network appliance. In one embodiment, reservation controller 301 includes a plurality of computing programming instructions, performing the functions of a reservation controller, residing in a computing device.

In one embodiment, resource controller 305 is a computing device 510 as illustrated in FIG. 2. In one embodiment, resource controller 305 resides in a data center, a network cloud, or in a premises co-located with autonomous device 201 or resource 331. In one embodiment, resource controller 305 includes a server computer or a network appliance. In one embodiment, resource controller 305 includes a plurality of computing programming instructions, performing the functions of a reservation controller, residing in a computing device.

In one embodiment, resource controller 305 and reservation controller 301 reside in the same computing device.

In one embodiment, data network 501 includes a wireless network, a cellular network, an Ethernet network, a local area network (LAN), the Internet, a personal area network (PAN), a home network, an enterprise data network, a virtual private network (VPN), or a public network.

Figure 5:
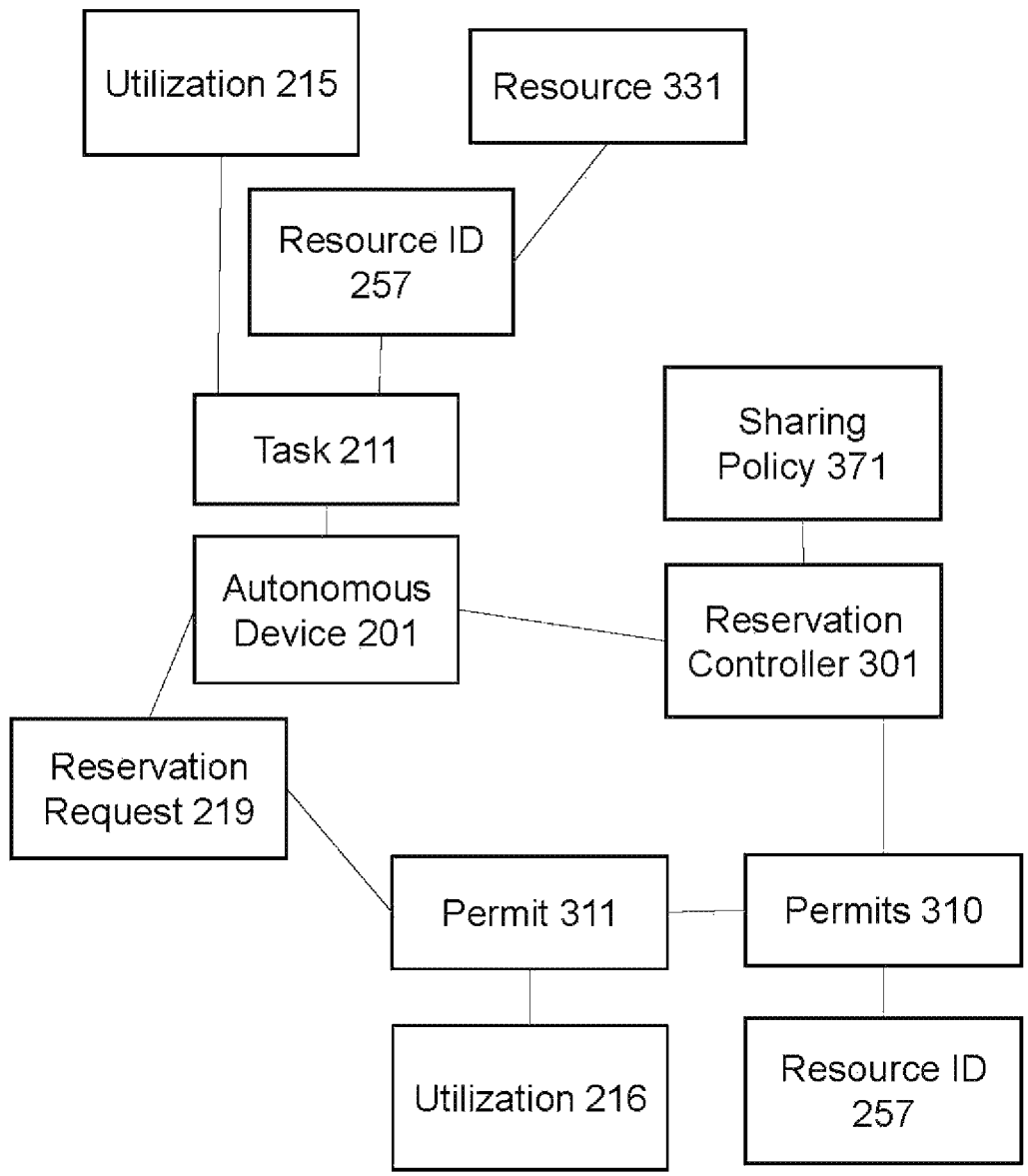
FIG. 5 illustrates an exemplary embodiment of a process to reserve a resource for an autonomous device.

FIG. 5 illustrates an exemplary embodiment of a process to reserve a resource for an autonomous device. In one embodiment, autonomous device 201 is performing or is going to perform task 211, which has a need to access resource 331 associated with a resource identity 257. In one embodiment, usage of resource 331 while performing task 211 is in accordance to utilization 215. Autonomous device 201 sends a reservation request 219 for resource 331 to reservation controller 301. Reservation request 219 includes autonomous device 201 identity, resource identity 257 and optionally task 211 identity and/or utilization 215.

Upon receiving reservation request 219, reservation controller 301 obtains autonomous device 201 identity and resource identity 257 from the reservation request 219. In one embodiment, reservation controller 301 applies resource sharing policy 371 to process reservation request 219. FIG. 6 illustrates embodiments of sharing policy 371. In one embodiment, sharing policy 371 includes one or more policies based on autonomous device priority, task priority, scheduling policy according to time utilization, deadline, or capacity utilization, network bandwidth partitioning policy, or resource partitioning policy.

Referring back to FIG. 5, in one embodiment, reservation controller 301 includes stored previously granted permits 310 from the processing of previously received reservation requests for the resource associated with the resource identity 257. Reservation controller 301 compares reservation request 219 with permits 310 as set forth in sharing policy 371. In one embodiment, reservation controller 301 determines reservation request 219 is to be denied, and reservation controller 301 sends a denial response to autonomous device 201. In receiving the denial response, autonomous device 201 performs task 211 without using resource 331, not perform task 211, or sends the reservation request 219 for the resource 331 again at a later time, according to one or more programming instructions stored in autonomous device 201.

In one embodiment, reservation controller 301 determines reservation request 219 is to be granted. In one embodiment, permits 310 do not include any previously granted permit associated with resource identity 257, and reservation controller 310 grants reservation request 219.

In one embodiment, permits 310 includes one or more previously granted permits associated with resource identity 257. Reservation controller 301 examines sharing policy 371 to determine if reservation request 219 is to be granted. In one embodiment, sharing policy 371 is based on autonomous device priority. In one embodiment, autonomous device 201 identity is of a higher priority than autonomous devices in previously granted permits in permits 310. Reservation controller 301 grants reservation request 219. In one embodiment, autonomous device 210 identity is of a lower priority than autonomous devices in permits 310. Reservation controller 301 may deny reservation request 219. In one embodiment, reservation controller 301 considers other policies in sharing policy 371 to decide if reservation request 219 is to be granted or denied.

In one embodiment, sharing policy 371 includes a task priority policy. Reservation controller 301 retrieves task 211 identity from reservation request 219 and matches task 211 priority with task priorities in previously granted permits in permits 310. If task 211 priority is of a higher priority, reservation controller 301 grants reservation request 219. If task 211 priority is of a lower priority, reservation 301 may deny reservation request 219 or consider additional policies in sharing policy 371.

In one embodiment, sharing policy 371 includes a deadline policy. Reservation controller 301 retrieves utilization 215 from reservation request 219 to determine a deadline specified in utilization 215. In one embodiment, a deadline includes a time when a task or resource access is to be completed or started, a capacity or capability limit indicating a task or resource access is to be completed or started. In one embodiment, utilization 215 includes a deadline. Reservation controller 301 compares deadline in utilization 215 to utilization specified in previously granted permits in permits 310, and determines if deadline in utilization 215 can be accommodated. If deadline in utilization 215 can be accommodated, reservation controller 301 grants reservation request 219. If not, reservation controller 301 denies reservation request 219.

In one embodiment, sharing policy 371 includes a time utilization policy. Reservation controller 301 retrieves utilization 215 from reservation request 219 to determine a time utilization is specified in utilization 215. In one embodiment, the time utilization includes a time, a time duration or a time schedule indicating when access or use of resource 311 is to be started, used or completed. In one embodiment, utilization 215 includes a time utilization. Reservation controller 301 compares the time utilization in utilization 215 to time utilization specified in previously granted permits in permits 310, and determines if the requested time utilization in utilization 215 can be accommodated. If the requested time utilization in utilization 215 cannot be accommodated, reservation controller 301 denies reservation request 219. If the requested time utilization can be accommodated, reservation controller 301 grants reservation request 219 with the requested time utilization. In one embodiment, reservation controller 301 determines a granted time utilization different from the requested time utilization. In one embodiment, the determined granted time utilization is calculated so as not to conflict with granted time utilization in previously granted permits. In one embodiment, a granted time utilization includes a start time, an ending time, a time duration, or a time schedule indicating access or usage of resource 331 is permitted.

In one embodiment, sharing policy 371 includes a capacity utilization policy. Reservation controller 301 retrieves utilization 215 from reservation request 219 to determine a capacity utilization is specified in utilization 215. In one embodiment, the capacity utilization includes a quantity of resource 331, such as 3 units or a room, an amount of data to be transferred such as 10 GB, a bandwidth for communication such as 1 Mbps or 55 Mbps, or a spatial capacity such as 20 ft×10 ft×3 ft. In one embodiment, utilization 215 includes a capacity utilization. Reservation controller 301 compares the capacity utilization in utilization 215 to capacity utilization in previously granted permits in permits 310, and determines if the requested capacity utilization in utilization 215 can be accommodated. If the requested capacity utilization in utilization 215 cannot be accommodated, reservation controller 301 denies reservation request 219. If the requested capacity utilization can be accommodated, reservation controller 301 grants reservation request 219 with the requested capacity utilization. Reservation controller 301 may determine a granted capacity utilization different from the requested capacity utilization. In one embodiment, the determined granted capacity utilization is calculated so as not to conflict with granted capacity utilization in previously granted permits. In one embodiment, a granted capacity utilization includes a quantity of a resource, a specific quality of resource such as room 204 or launch pad 4, a data capacity such as 4 GB, a bandwidth capacity such as 5 Mbps, or a spatial capacity such as 7 m×5 m×1.5 m.

In one embodiment, sharing policy 371 includes a network partitioning policy. In one embodiment, resource 331 is related to usage of a data network. In one embodiment, a data network may include a wireless network, a wired network, an optical network, a home network, a private network, or a VPN. In one embodiment, a network partition may include one or more channels for wireless network, a VLAN of an Ethernet, a sub-network of a local area network, a set of network addresses, a subset of network switches in the data network, or a bandwidth capacity of the data network. Reservation controller 301 may determine a network resource utilization and includes the determined network resource utilization in permit 311. In one embodiment, reservation controller 301 calculates network resource utilization according to granted network resource utilization in previously granted permits 310, so as not to be in conflict with the granted network resource utilization in the granted permits 310. In one embodiment, a granted network resource utilization may include one or more channels, one or more specific channels, a VLAN identity, a sub-network identity, a range of network addresses, a network switch identity or a bandwidth capacity and parameters.

In one embodiment, sharing policy 371 includes a resource partitioning policy. In one embodiment, resource 331 is related to a resource. Reservation controller 301 may determine a sub-resource utilization and previously granted permits in permits 310, and includes the determined sub-resource utilization in permit 311. In one embodiment, reservation controller 301 determines sub-resource utilization. A sub-resource refers to one or more partitions of resource. An autonomous device requests access to one or more partitions of the resource, and the reservation controller 301 determines which sub-resource(s) of the resource is to be granted according to the sub-resource utilization and according to granted sub-resource utilization in previously granted permits 310 such that conflict with previously granted sub-resource utilizations are avoided. In one embodiment, a sub-resource is an individual room in a multi-room building, and reservation controller 301 determines that the sub-resource utilization is to be granted for a specific room. In one embodiment, an autonomous device requests access to five crates in a warehouse, and reservation controller 301 determines that the sub-resource utilization is to be granted for two of the five crates, and the permit 311 includes the identity of the two crates. In one embodiment, an autonomous car requests access to a parking spot in a parking lot where the requested utilization shows the size of car, and reservation controller 301 grants a sub-resource utilization for a parking space in the parking lot that is large enough to fit the car. In one embodiment, a granted resource partitioning utilization may include a quantity of resources, or a sub-resource identity.

In one embodiment, reservation controller 301 processes reservation request 219 in lieu of previously granted permits in permits 310 using a resource scheduling algorithm, an expert system, a machine learning system, a queueing algorithm, a sorting algorithm, or a statistical system to schedule a time utilization, allocate a capacity utilization, allocate a network or resource partition such that the time utilization, the capacity utilization, or the network or network partition do not conflict with previously granted permits in permits 310. Reservation controller 301 generates utilization 216 accordingly to the time utilization schedule, the capacity utilization allocation, or the network or resource partition allocation. Such resource scheduling algorithm, expert system, machine learning system, queueing algorithm, sorting algorithm and statistical system are known to those skilled in the arts and are not described further herein.

In one embodiment, upon the determination to grant reservation request 219, reservation controller 301 generates permit 311 for reservation request 219. In one embodiment, the permit 311 includes autonomous device 201 identity, resource identity 257, optionally task 211 identity, and optionally utilization 215. In one embodiment, reservation controller 301 generates a granted utilization 216, different or modified from the requested utilization 215 with possibly different time utilization, deadline, capacity utilization, network resource partition, or resource partition. The granted utilization 216 is included in the permit 311. Reservation controller 301 sends permit 311 to autonomous device 201. Upon receiving permit 311, autonomous device 201 proceeds to perform task 211, including accessing resource 331 according to permit 311. In one embodiment, the granted utilization 216 in the permit 311 includes a time utilization and autonomous device 201 accesses resource 331 according to the time utilization. In one embodiment, the granted utilization 216 in the permit 311 includes a deadline, a capacity utilization, a network resource utilization, or a resource partitioning utilization. Autonomous device 201 accesses resource 331 according to the deadline, the capacity utilization, the network resource utilization, or the resource partition utilization as indicated in permit 311.

In one embodiment, reservation controller 301 cannot obtain sufficient information in reservation request 219 to process the request according to sharing policy 371. As a result, reservation controller 301 denies the request.

Figure 7:
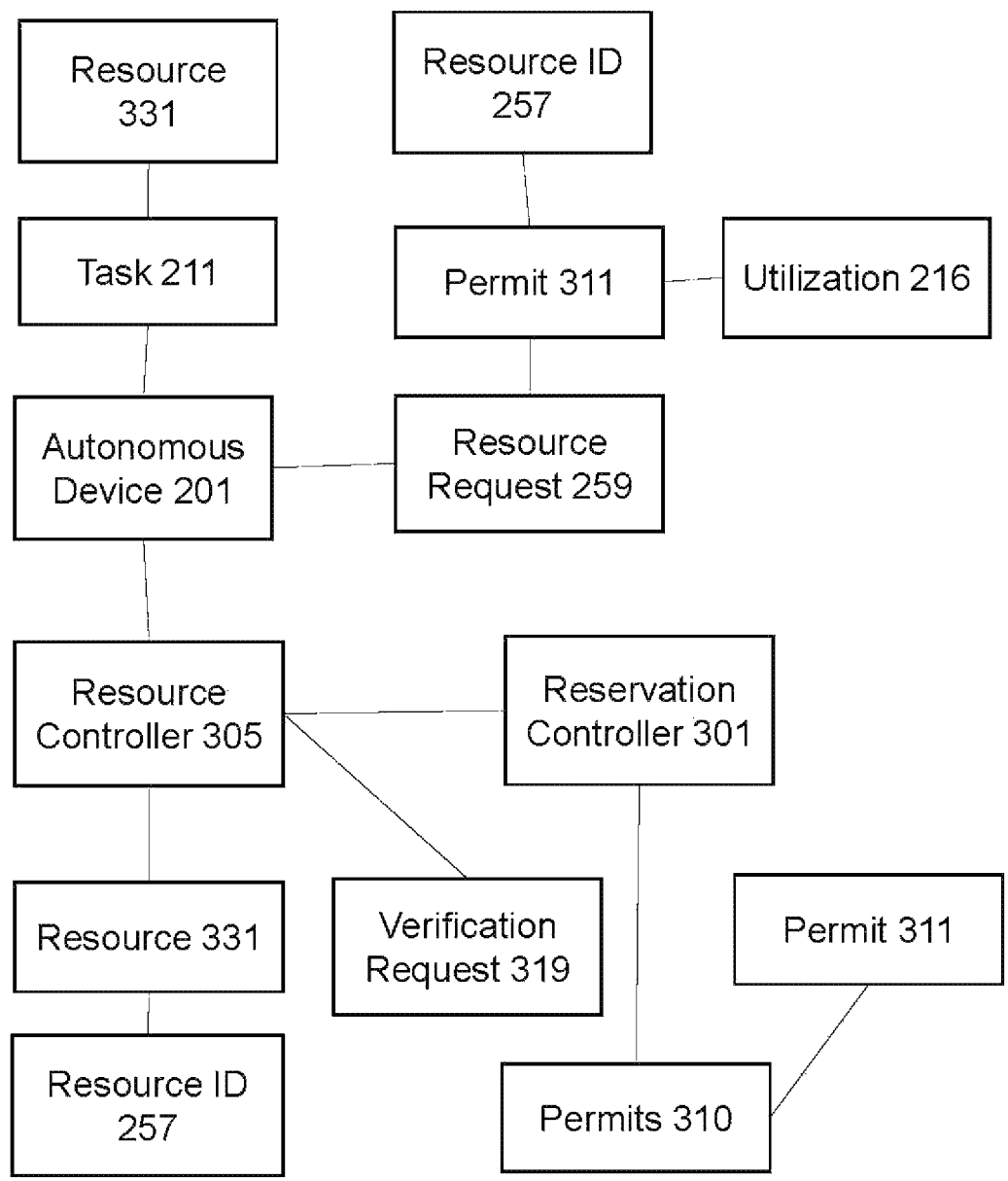
FIG. 7 illustrates an exemplary embodiment of a process to obtain a resource using a permit.

FIG. 7 illustrates an exemplary embodiment of a process to obtain a resource using a permit. In one embodiment, autonomous device 201 obtains permit 311 from reservation controller 301, as described above with reference to FIG. 5. In one embodiment, autonomous device 201 sends a resource request 259 to resource controller 305 to request access to resource 331. Autonomous device 201 includes permit 311 in resource request 259. In one embodiment, autonomous device 201 includes resource identity 257, task 211 identity, autonomous device 201 identity and utilization 216 in resource request 259. Some of these information may be stored in permit 311.

Upon receiving resource request 219, resource controller 305 obtains from permit 311, one or more of autonomous device 201 identity, task 211 identity, resource identity 257, and utilization 216. In one embodiment, resource controller 305 matches resource identity 257 to resource 331 and sends resource 331 to autonomous device 201 for use in performing the task 211. In one embodiment, resource controller 305 allows resource 331 to be used according to utilization 216.

In one embodiment, resource controller 305 sends a verification request 319 containing permit 311 to reservation controller 301 to verify if permit 311 is valid. Reservation controller 301 matches permit 311 against a list of granted permits in permits 310. In one embodiment, reservation controller 301 finds a match of permit 311 in permits 310. Reservation controller 301 sends a confirmation of validity of permit 311 to resource controller 305. Resource controller 305 subsequently sends resource 331 to autonomous device 201. In one embodiment, reservation controller 301 does not find a match for permit 311. Reservation controller 301 sends an invalid indication for permit 311 to resource controller 305. Resource controller 305 subsequently sends an error indication to autonomous device 201 and denies access to resource 331 by autonomous device 201.

In one embodiment, autonomous device 201 receives a denial indication from resource controller 305. Autonomous device 201 may attempt to obtain another permit from reservation controller 301 in order to access resource 331. In one embodiment, autonomous device 201 decides not to request access to resource 331 or performs task 211 without accessing resource 331.

In one embodiment, autonomous device 201 receives confirmation to access resource 331 from resource controller 305. Autonomous device 201 proceeds to perform task 211 that utilizes resource 331. In one embodiment, permit 311 includes utilization 216. Autonomous device 201 uses resource 331 according to utilization 216 while performing task 211.

In one embodiment, resource controller 305 stores resource request 259 in a datastore.

Figure 8:
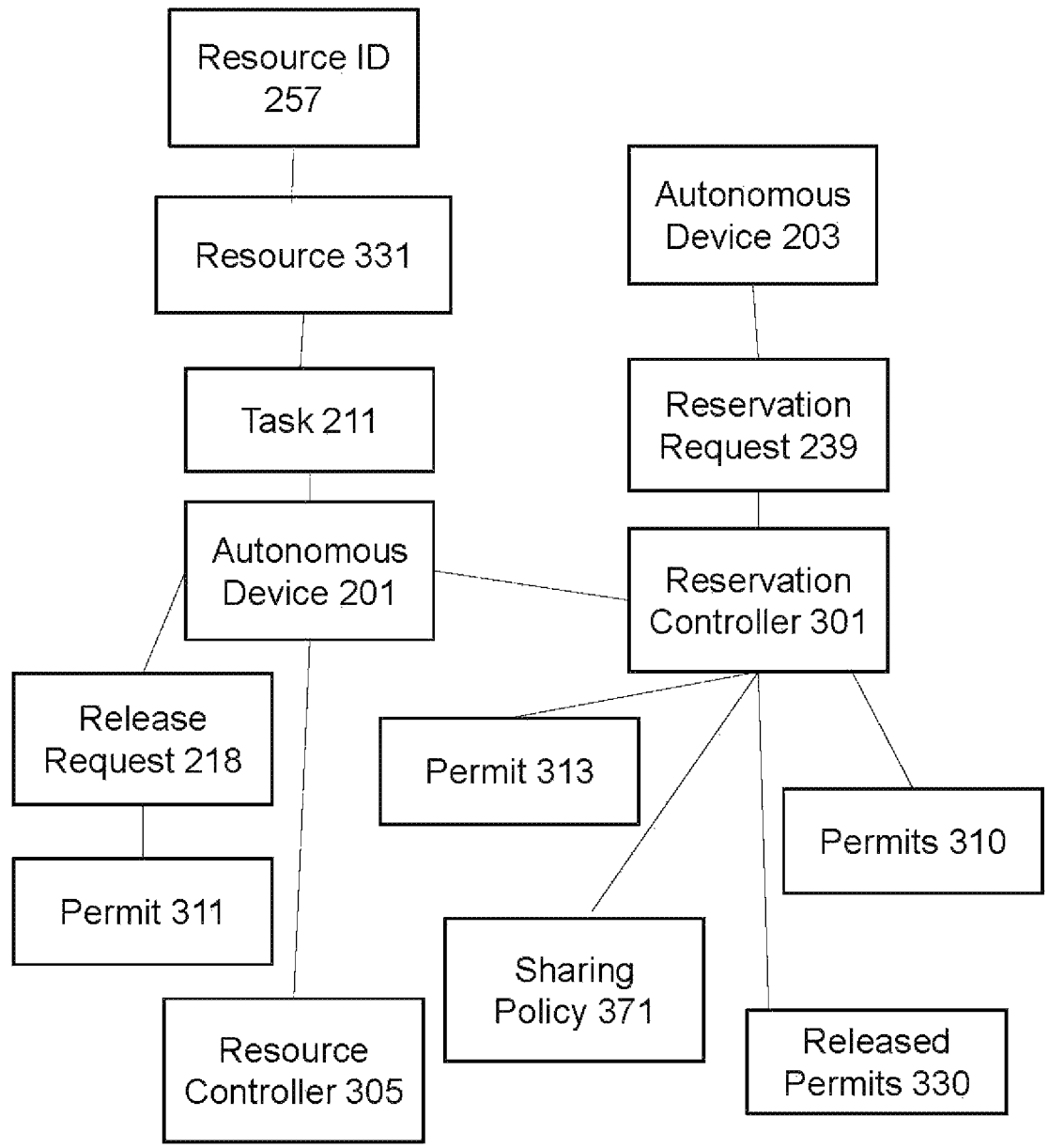
FIG. 8 illustrates an exemplary embodiment of a process to release a resource reservation permit.

FIG. 8 illustrates an exemplary embodiment of a process to release a resource reservation permit. In one embodiment, autonomous device 201 determines task 211 completes usage of resource 331 or no longer requires access to resource 331. In one embodiment, autonomous device 201 sends a release request 218 comprising permit 311 to reservation controller 301 to indicate permit 311 is no longer needed. Upon receiving release request 218 and permit 311, reservation controller 301 removes permit 311 from permits 310. In one embodiment, reservation controller 301 sets permit 311, stored in permits 310, with an indication as "released", "expired" or an inactive indication. In one embodiment, reservation controller 301 stores released permit 311 in a released permit list 330. In one embodiment, reservation controller 301 processes another reservation request 239 from another autonomous device 203. Reservation controller 301 processes reservation request 239 with consideration for the removal of permit 311 and sharing policy 371. In one embodiment, reservation controller 301 generates a permit 313, to be stored in permits 310, in response to reservation request 239, and sends permit 313 to autonomous device 203.

In one embodiment, reservation controller 301 stores in permit 311 a start time indication when reservation controller 301 generates permit 311, and a release time indication when reservation controller 301 receives release request 218 for permit 311.

In one embodiment, autonomous device 201 additionally sends release request 218 containing permit 311 or resource identity 257 to resource controller 305 indicating a completion of access of resource 331. In one embodiment, resource controller 305 removes permit 311 from previously stored permits 310 in a local datastore.

Figure 9:
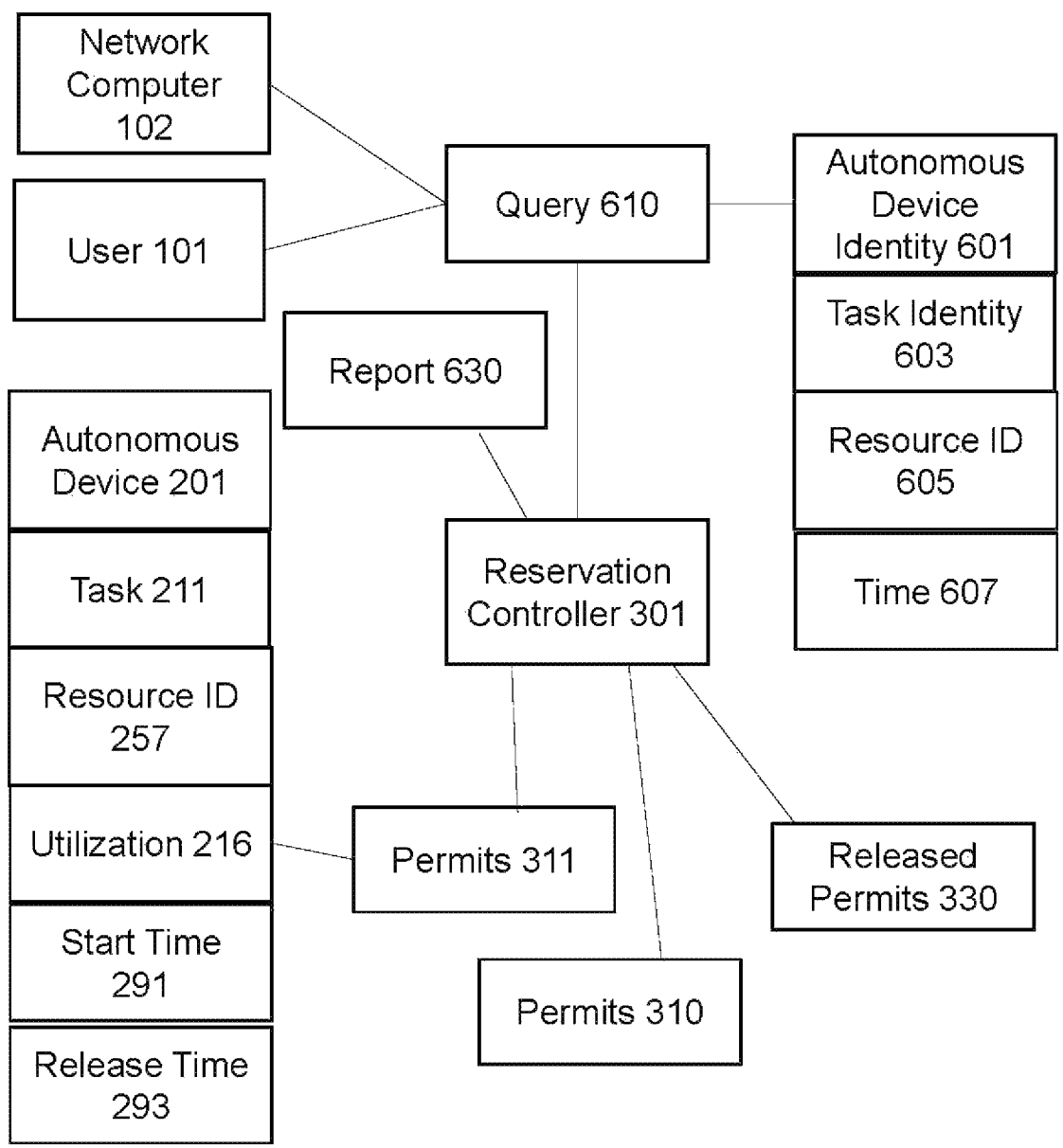
FIG. 9 illustrates an exemplary embodiment of processing a query by reservation controller.

FIG. 9 illustrates an exemplary embodiment of processing a query by reservation controller. In one embodiment, reservation controller 301 receives and processes a query 610. In one embodiment, reservation controller 301 receives query 610 from a user 101 or from a network computer 102 via a data network. In one embodiment, query 610 includes a spoken language question from user 101, and reservation controller 301 processes the spoken language question using natural language processing. Reservation controller 301 matches query 610 against permits 310 and optionally released permits 330 to find one or more permits, such as a permit 311, matching query 610. In one embodiment, reservation controller 301 generates a report 630 consisting of the one or more matching permits, such as permit 311, and sends report 630 as a response to query 610. In one embodiment, report 630 is presented on a mobile device, a personal computer, a network computing device, or announced via a speaker to a user.

In one embodiment, query 610 includes one or more attributes of an autonomous device identity 601, a task description or task identity 603, a resource description or resource identity 605, and a time 607.

In one embodiment, reservation controller 301 selects a permit 311 from permits 310 or released permits 330 and determines if permit 311 matches query 610. In one embodiment, permit 311 matches query 610 when one or more attributes of query 610 are satisfied. In one permit 311 includes one or more of autonomous device 201 identity, task 211 identity, resource identity 257, utilization 216, start time 291 and release time 293 that permit 311 was released. In one embodiment, reservation controller 301 matches autonomous device 201 identity to autonomous device identity 601, matches task 211 identity to task identity 603, and/or matches resource identity 257 to resource identity 605 to determine that the query 610 attributes are satisfied. In one embodiment, reservation controller 301 matches start time 291 and/or release time 293 to time 507 to determine if time 607 attribute is satisfied. In one embodiment, utilization 216 includes a time attribute and reservation controller 301 matches the time attribute of utilization 216 with time 607 to determine if the time 607 attribute is satisfied. In one embodiment, when all query 610 attributes are satisfied, reservation controller 301 generates report 630 and includes permit 311 in report 630. In one embodiment, when one or more of query 610 attributes are not satisfied, reservation controller 301 includes permit 311 in report 630 and may indicate that permit 311 does not satisfy all query 610 attributes.

In one embodiment, reservation controller 301 sends report 630 to user 101.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for resource sharing by a plurality of autonomous devices in an environment, comprising:
   (a) during a performance of a first task, sending, by a first autonomous device of the plurality of autonomous devices to a reservation controller, a first reservation request for access to a resource in the environment, by the first autonomous device, the first reservation request comprising a first requested time utilization, the first requested time utilization comprising a time schedule for immediate access to the resource by the first autonomous device, wherein the plurality of autonomous devices function in the environment without communication with each other regarding the resource;
   (b) receiving, by the first autonomous device from the reservation controller, a first permit for access to the resource by the first autonomous device during the requested time schedule for immediate access to the resource, the immediate access being accommodated among time utilizations specified in active permits, the first permit comprising a first granted time utilization for usage of the resource by the first autonomous device;
   (c) sending, by the first autonomous device to a resource controller, a resource request for access to the resource at the granted time utilization, the resource request comprising the first permit;
   (d) receiving, by the first autonomous device, access to the resource according to the granted time utilization in the first permit; and
   (e) continuing to perform the first task while using the resource according to the first granted time utilization, by the first autonomous device.

2. The method of claim 1, wherein during the continuing (e), the method further comprises:
   (f) sending, by a second autonomous device of the plurality of autonomous devices to the reservation controller, a second reservation request for access to the resource required by the second autonomous device to perform a second task, the second reservation request comprising a second requested time utilization for usage of the resource by the second autonomous device;
   (g) receiving, by the second autonomous device from the reservation controller, a second permit for access to the resource by the second autonomous device, the second permit comprising a second granted time utilization for usage of the resource by the second autonomous device, the second granted time utilization being accommodated among the time utilizations specified in the active permits; and
   (h) performing the second task using the resource according to the second granted time utilization, by the second autonomous device.

3. The method of claim 2, wherein the second granted time utilization is different from the first granted time utilization, wherein the second granted time utilization does not conflict with the first granted time utilization.

4. The method of claim 2, wherein the first autonomous device comprises one or more first sensors and the second autonomous device comprises one or more second sensors, the one or more first sensors for capturing a first plurality of data from the environment, the one or more second sensors for capturing a second plurality of data from the environment, wherein the resource comprises a transmission medium for data communication, wherein the first task and the second task comprise use of a capacity of the transmission medium, wherein the continuing to perform (e) and the performing (h) comprise:
   (e1) accessing, by the first autonomous device, the transmission medium and sending the first plurality of data to a first network computing device over the transmission medium according to the first granted time utilization and to a first granted transmission medium capacity utilization; and
   (h1) accessing, by the second autonomous device, the transmission medium and sending the second plurality of data to a second network computing device over the transmission medium according to the second granted time utilization and to a second granted transmission medium capacity utilization.

5. The method of claim 2, wherein the first autonomous device comprises a first motor and the second autonomous device comprises a second motor, wherein the resource comprises a physical object residing in the environment, wherein the first task and the second task comprise interfacing with the physical object, wherein the continuing to perform (e) and the performing (h) comprise:
   (e1) interfacing, by the first autonomous device, with the physical object using the first motor according to the first granted time utilization and a first granted interface utilization; and (h1) interfacing, by the second autonomous device, with the physical object using the second motor according to the second granted time utilization and a second granted interface utilization.

6. The method of claim 2, wherein the first autonomous device comprises a first motor and the second autonomous device comprises a second motor, wherein the resource comprises a physical space within the environment, wherein the first task and the second task comprise navigation within the physical space, wherein the continuing to perform (e) and the performing (h) comprise:
(e1) navigating, by the first autonomous device, within the physical space using the first motor according to the first granted time utilization and a first granted navigation utilization; and
(h1) navigating, by the second autonomous device, within the physical space using the second motor according to the second granted time utilization and a second granted navigation utilization.

7. The method of claim 2, wherein the first autonomous device comprises a first control unit and the second autonomous device comprises a second control unit, wherein the resource comprises a physical device residing within the environment, wherein the first task and the second task comprise operation of the physical device, wherein the continuing to perform (e) and the performing (h) comprise:
(e1) operating the physical device, by the first control unit of the first autonomous device, according to the first granted time utilization and a first granted operation utilization; and
(h1) operating the physical device, by the second control unit of the second autonomous device, according to the second granted time utilization and a second granted operation utilization.

8. The method of claim 1, wherein the first granted time utilization comprises a manner in which the resource can be handled, manipulated, or altered for the first autonomous device to perform the first task or by the first autonomous device in performing the first task.

9. The method of claim 1, wherein the first requested time utilization is different from the first granted time utilization.

10. The method of claim 1, further comprising:
(f) determining, by the first autonomous device, that the access to the resource is no longer required; and
(g) in response to determining that the access to the resource is no longer required, sending, by the first autonomous device to the reservation controller, a release request comprising the first permit.

11. The method of claim 1, wherein the plurality of autonomous devices comprises a plurality of autonomous aerial vehicles.

12. One or more non-transitory computer readable media comprising computer readable program code collectively embodied on the one or more computer readable media, the computer readable program code for resource sharing by a plurality of autonomous devices in an environment, wherein when executed by one or more processors cause the one or more processors to:
(a) during a performance of a first task, send, by a first autonomous device of the plurality of autonomous devices to a reservation controller, a first reservation request for access to a resource in the environment by the first autonomous device, the first reservation request comprising a first requested time utilization, the first requested time utilization comprising a time schedule for immediate access to the resource by the first autonomous device, wherein the plurality of autonomous devices function in the environment without communication with each other regarding the resource;
(b) receive, by the first autonomous device from the reservation controller, a first permit for access to the resource when the requested time schedule for immediate access to the resource can be accommodated among time utilizations specified in active permits, the first permit comprising a first granted time utilization for usage of the resource by the first autonomous device;
(c) send, by the first autonomous device to a resource controller, a resource request for access to the resource at the granted time utilization, the resource request comprising the first permit;
(d) receive, by the first autonomous device, access to the resource according to the granted time utilization in the first permit; and
(e) continue to perform the first task while using the resource according to the first granted time utilization, by the first autonomous device.

13. The media of claim 12, wherein, during the continue (e), the one or more processors are further caused to:
(f) send, by a second autonomous device of the plurality of autonomous devices to the reservation controller, a second reservation request for access to the resource required by the second autonomous device to perform a second task, the second reservation request comprising a second requested time utilization for usage of the resource by the second autonomous device;
(g) receive, by the second autonomous device from the reservation controller, a second permit for access to the resource by the second autonomous device, the second permit comprising a second granted time utilization for usage of the resource by the second autonomous device, the second granted time utilization being accommodated among the time utilizations specified in the active permits; and
(h) perform the second task using the resource according to the second granted time utilization, by the second autonomous device.

14. The media of claim 13, wherein the second granted time utilization is different from the first granted time utilization, wherein the second granted time utilization does not conflict with the first granted time utilization.

15. The media of claim 13, wherein the first autonomous device comprises one or more first sensors and the second autonomous device comprises one or more second sensors, the one or more first sensors for capturing a first plurality of data from the environment, the one or more second sensors for capturing a second plurality of data from the environment, wherein the resource comprises a transmission medium for data communication, wherein the first task and the second task comprise use of a capacity of the transmission medium, wherein the continue to perform (e) and the perform (h) comprise:
(e1) access, by the first autonomous device, the transmission medium and sending the first plurality of data to a first network computing device over the transmission medium according to the first granted time utilization and to a first granted transmission medium capacity utilization; and
(h1) access, by the second autonomous device, the transmission medium and sending the second plurality of data to a second network computing device over the transmission medium according to the second granted time utilization and a second granted transmission medium capacity utilization.

16. The media of claim 13, wherein the first autonomous device comprises a first motor and the second autonomous device comprises a second motor, wherein the resource comprises a physical object residing in the environment, wherein the first task and the second task comprise interfacing with the physical object, wherein the continue to perform (e) and the perform (h) comprise:
   (e1) interface, by the first autonomous device, with the physical object using the first motor according to the first granted time utilization and a first granted interface utilization; and
   (h1) interface, by the second autonomous device, with the physical object using the second motor according to the second granted time utilization and a second granted interface utilization.

17. The media of claim 13, wherein the first autonomous device comprises a first motor and the second autonomous device comprises a second motor, wherein the resource comprises a physical space within the environment, wherein the first task and the second task comprise navigation within the physical space, wherein the continue to perform (e) and the perform (h) comprise:
   (e1) navigate, by the first autonomous device, within the physical space using the first motor according to the first granted time utilization and a first navigation utilization; and
   (f1) navigate, by the second autonomous device, within the physical space using the second motor according to the second granted time utilization and a second navigation utilization.

18. The media of claim 13, wherein the first autonomous device comprises a first control unit and the second autonomous device comprises a second control unit, wherein the resource comprises a physical device residing within the environment, wherein the first task and the second task comprise operation of the physical device, wherein the continue to perform (e) and the perform (h) comprise:
   (c1) operate the physical device, by the first control unit of the first autonomous device, according to the first granted time utilization and a first granted operation utilization; and
   (f1) operate the physical device, by the second control unit of the second autonomous device, according to the second granted time utilization and a second granted operation utilization.

19. The media of claim 12, wherein the first granted time utilization comprises a manner in which the resource can be handled, manipulated, or altered for the first autonomous device to perform the first task or by the first autonomous device in performing the first task.

20. The media of claim 12, wherein the first requested time utilization is different from the first granted time utilization.

21. The media of claim 12, wherein the one or more processors are further caused to:
   (f) determine, by the first autonomous device, that the access to the resource is no longer required; and
   (g) in response to determining that the access to the resource is no longer required, send, by the first autonomous device to the reservation controller, a release request comprising the first permit.

22. The media of claim 12, wherein the plurality of autonomous devices comprises a plurality of autonomous aerial vehicles.

23. A system comprising:
   a plurality of autonomous devices in an environment; and
   a first autonomous device of the plurality of autonomous devices for:
   (a) during a performance of a first task, sending, to a reservation controller, a first reservation request for access to a resource in the environment by the first autonomous device, the first reservation request comprising a first requested time utilization, the first requested time utilization comprising a time schedule for immediate access to the resource by the first autonomous device, wherein the plurality of autonomous devices function in the environment without communication with each other regarding the resource;
   (b) receiving, from the reservation controller, a first permit for access to the resource by the first autonomous device during the requested time schedule for immediate access to the resource, the immediate access being accommodated among time utilizations specified in active permits, the first permit comprising a first granted time utilization for usage of the resource by the first autonomous device;
   (c) sending, to a resource controller, a resource request for access to the resource at the granted time utilization, the resource request comprising the first permit;
   (d) receiving access to the resource according to the granted time utilization in the first permit; and
   (e) continuing to perform the first task while using the resource according to the first granted time utilization.

24. The system of claim 23, wherein the continuing (e), the system further comprises a second autonomous device of the plurality of autonomous device for:
   (f) sending, to the reservation controller, a second reservation request for access to the resource required by the second autonomous device to perform a second task, the second reservation request comprising a second requested utilization for usage of the resource by the second autonomous device;
   (g) receiving, from the reservation controller, a second permit for access to the resource by the second autonomous device, the second permit comprising a second granted time utilization for usage of the resource by the second autonomous device, the second granted time utilization being accommodated among the time utilizations specified in the active permits; and
   (h) performing the second task using the resource according to the second granted time utilization.

25. The system of claim 24, wherein the second granted time utilization is different from the first granted time utilization, wherein the second granted time utilization does not conflict with the first granted time utilization.

26. The system of claim 24, wherein the first autonomous device comprises one or more first sensors and the second autonomous device comprises one or more second sensors, the one or more first sensors for capturing a first plurality of data from the environment, the one or more second sensors for capturing a second plurality of data from the environment, wherein the resource comprises a transmission medium for data communication, wherein the first task and the second task comprise use of a capacity of the transmission medium, wherein the continuing to perform (e) and the performing (h) comprise:
   (e1) accessing, by the first autonomous device, the transmission medium and sending the first plurality of data to a first network computing device over the transmission medium according to the first granted time utilization and a first granted transmission medium capacity utilization; and (h1) accessing, by the second autonomous device, the transmission medium and sending the second plurality of data to a second network computing device over the transmission medium according to the second granted time utilization and a second granted transmission medium capacity utilization.

27. The system of claim 24, wherein the first autonomous device comprises a first motor and the second autonomous device comprises a second motor, wherein the resource comprises a physical object residing in the environment, wherein the first task and the second task comprise interfacing with the physical object, wherein the continuing to perform (e) and the performing (h) comprise:
   (e1) interfacing, by the first autonomous device, with the physical object using the first motor according to the first granted time utilization and a first granted interface utilization; and
   (h1) interfacing, by the second autonomous device, with the physical object using the second motor according to the second granted time utilization and a second granted interface utilization.

28. The system of claim 24, wherein the first autonomous device comprises a first motor and the second autonomous device comprises a second motor, wherein the resource comprises a physical space within the environment, wherein the first task and the second task comprise navigation within the physical space, wherein the continuing to perform (e) and the performing (h) comprise:
   (e1) navigating, by the first autonomous device, within the physical space using the first motor according to the first granted time utilization and a first granted navigation utilization; and
   (h1) navigating, by the second autonomous device, within the physical space using the second motor according to the second granted time utilization and a second granted navigation utilization.

29. The system of claim 24, wherein the first autonomous device comprises a first control unit and the second autonomous device comprises a second control unit, wherein the resource comprises a physical device residing within the environment, wherein the first task and the second task comprise operation of the physical device, wherein the continuing to perform (e) and the performing (h) comprise:
   (e1) operating the physical device, by the first control unit of the first autonomous device, according to the first granted time utilization and a first granted operation utilization; and
   (h1) operating the physical device, by the second control unit of the second autonomous device, according to the second granted time utilization and a second granted operation utilization.

30. The system of claim 23, wherein the first granted time utilization comprises a manner in which the resource can be handled, manipulated, or altered for the first autonomous device to perform the first task or by the first autonomous device in performing the first task.

31. The system of claim 23, wherein the first requested time utilization is different from the first granted time utilization.

32. The system of claim 23, wherein the first autonomous device is further for:
   (f) determining that the access to the resource is no longer required; and
   (g) in response to determining that the access to the resource is no longer required, sending a release request comprising the first permit to the reservation controller.

33. The system of claim 23, wherein the plurality of autonomous devices comprises a plurality of autonomous aerial vehicles.

34. A method for resource sharing by a plurality of autonomous aerial vehicles in an environment, comprising:
   (a) during a performance of a first task, sending, by a first autonomous aerial vehicle of the plurality of autonomous aerial vehicles to a reservation controller, a first reservation request for access to a resource in the environment by the first autonomous aerial vehicle, the first reservation request comprising a first requested utilization, the first requested utilization comprising a priority based on one or more of a package carried by the first autonomous aerial vehicle and a remaining fuel capacity of the first autonomous aerial vehicle, the first requested utilization further comprising a time schedule for immediate access to the resource by the first autonomous aerial vehicle, wherein the plurality of autonomous aerial vehicles function in the environment without communication with each other regarding the resource;
   (b) receiving, by the first autonomous aerial vehicle from the reservation controller, a first permit for access to the resource by the first autonomous aerial vehicle during the requested time schedule for immediate access to the resource, the first permit comprising a first granted utilization for usage of the resource by the first autonomous aerial vehicle,
   wherein the priority, the remaining fuel capacity, and the immediate access are accommodated among utilizations specified in active permits; and
   (c) continuing to perform the first task while using the resource according to the first granted utilization, by the first autonomous aerial vehicle.

35. The method of claim 34, wherein during the continuing (c), the method further comprises:
   (d) sending, by a second autonomous aerial vehicle of the plurality of autonomous aerial vehicles to the reservation controller, a second reservation request for access to the resource required by the second autonomous aerial vehicle to perform a second task, the second reservation request comprising a second requested utilization for usage of the resource by the second autonomous aerial vehicle;
   (e) receiving, by the second autonomous aerial vehicle from the reservation controller, a second permit for access to the resource by the second autonomous aerial vehicle, the second permit comprising a second granted utilization for usage of the resource by the second autonomous aerial vehicle, the second granted utilization being accommodated among the utilizations specified in the active permits; and
   (f) performing the second task using the resource according to the second granted utilization, by the second autonomous aerial vehicle.

36. The method of claim 35, wherein the second granted utilization is different from the first granted utilization, wherein the second granted utilization does not conflict with the first granted utilization.

37. The method of claim 35, wherein the first aerial vehicle comprises a first motor and the second autonomous aerial vehicle comprises a second motor, wherein the resource comprises a physical space within the environment, wherein the first task and the second task comprise navigation within the physical space, wherein the continuing to perform (c) and the performing (f) comprise:

(c1) navigating, by the first autonomous aerial vehicle, within the physical space using the first motor according to a first granted time utilization and a first granted navigation utilization; and (f1) navigating, by the second autonomous aerial vehicle, within the physical space using the second motor according to a second granted time utilization and a second granted navigation utilization.

38. The method of claim 34, wherein the first granted utilization comprises a manner in which the resource can be handled, manipulated, or altered for the first autonomous aerial vehicle to perform the first task or by the first autonomous aerial vehicle in performing the first task.

39. The method of claim 34, wherein the first requested utilization is different from the first granted utilization.

40. One or more non-transitory computer readable media comprising computer readable program code collectively embodied on the one or more computer readable media, the computer readable program code for resource sharing by a plurality of autonomous aerial vehicles in an environment, wherein when executed by one or more processors cause the one or more processors to:

(a) during a performance of a first task, send, by a first autonomous aerial vehicle of the plurality of autonomous aerial vehicles to a reservation controller, a first reservation request for access to a resource in the environment by the first autonomous aerial vehicle, the first reservation request comprising a first requested utilization, the first requested utilization comprising a priority based on one or more of a package carried by the first autonomous aerial vehicle and a remaining fuel capacity of the first autonomous aerial vehicle, the first requested utilization further comprising a time schedule for immediate access to the resource by the first autonomous aerial vehicle, wherein the plurality of autonomous aerial vehicles function in the environment without communication with each other regarding the resource;

(b) receive, by the first autonomous aerial vehicle from the reservation controller, a first permit for access to the resource by the first autonomous aerial vehicle during the requested time schedule for immediate access to the resource, the first permit comprising a first granted utilization for usage of the resource by the first autonomous aerial vehicle, wherein the priority, the remaining fuel capacity, and the immediate access are accommodated among utilizations specified in active permits; and (c) continue to perform the first task while using the resource according to the first granted utilization, by the first autonomous aerial vehicle.

41. The media of claim 40, wherein during the continuing (c), the one or more processors are further caused to:

(d) send, by a second autonomous aerial vehicle of the plurality of autonomous aerial vehicles to the reservation controller, a second reservation request for access to the resource required by the second autonomous aerial vehicle to perform a second task, the second reservation request comprising a second requested utilization for usage of the resource by the second autonomous aerial vehicle;

(e) receive, by the second autonomous aerial vehicle from the reservation controller, a second permit for access to the resource by the second autonomous aerial vehicle, the second permit comprising a second granted utilization for usage of the resource by the second autonomous aerial vehicle, the second granted utilization being accommodated among the utilizations specified in the active permits; and (f) perform the second task using the resource according to the second granted utilization, by the second autonomous aerial vehicle.

42. The media of claim 41, wherein the second granted utilization is different from the first granted utilization, wherein the second granted utilization does not conflict with the first granted utilization.

43. The media of claim 41, wherein the first aerial vehicle comprises a first motor and the second autonomous aerial vehicle comprises a second motor, wherein the resource comprises a physical space within the environment, wherein the first task and the second task comprise navigation within the physical space, wherein the continuing to perform (c) and the perform (f) comprise:

(c1) navigate, by the first autonomous aerial vehicle, within the physical space using the first motor according to a first granted time utilization and a first granted navigation utilization; and (f1) navigate, by the second autonomous aerial vehicle, within the physical space using the second motor according to a second granted time utilization and a second granted navigation utilization.

44. The media of claim 40, wherein the first granted utilization comprises a manner in which the resource can be handled, manipulated, or altered for the first autonomous aerial vehicle to perform the first task or by the first autonomous aerial vehicle in performing the first task.

45. The media of claim 40, wherein the first requested utilization is different from the first granted utilization.

46. A system comprising:

a plurality of autonomous aerial vehicles in an environment; and a first autonomous aerial vehicle of the plurality of autonomous aerial vehicles for:

(a) during a performance of a first task, sending, to a reservation controller, a first reservation request for access to a resource in the environment by the first autonomous vehicle, the first reservation request comprising a first requested utilization, the first requested utilization comprising a priority based on one or more of a package carried by the first autonomous aerial vehicle and a remaining fuel capacity of the first autonomous aerial vehicle, the first requested utilization further comprising a time schedule for immediate access to the resource by the first autonomous aerial vehicle, wherein the plurality of autonomous aerial vehicles function in the environment without communication with each other regarding the resource;

(b) receiving, from the reservation controller, a first permit for access to the resource by the first autonomous aerial vehicle during the requested time schedule for immediate access to the resource, the first permit comprising a first granted utilization for usage of the resource by the first autonomous aerial vehicle, wherein the priority, the remaining fuel capacity, and the immediate access are accommodated among utilizations specified in active permits; and (c) continuing to perform the first task while using the resource according to the first granted utilization.

47. The system of claim 46, wherein during the continuing (c), the system further comprises a second autonomous aerial vehicle of the plurality of autonomous aerial vehicles for:

(d) sending, to the reservation controller, a second reservation request for access to the resource required by the second autonomous aerial vehicle to perform a second task, the second reservation request comprising a second requested utilization for usage of the resource by the second autonomous aerial vehicle;

(e) receiving, from the reservation controller, a second permit for access to the resource by the second autonomous aerial vehicle, the second permit comprising a second granted utilization for usage of the resource by the second autonomous aerial vehicle, the second granted utilization being accommodated among the utilizations specified in the active permits; and (f) performing the second task using the resource according to the second granted utilization, by the second autonomous aerial vehicle.

48. The system of claim 47, wherein the second granted utilization is different from the first granted utilization, wherein the second granted utilization does not conflict with the first granted utilization.

49. The system of claim 47, wherein the first aerial vehicle comprises a first motor and the second autonomous aerial vehicle comprises a second motor, wherein the resource comprises a physical space within the environment, wherein the first task and the second task comprise navigation within the physical space, wherein the continuing to perform (c) and the performing (f) comprise:

(c1) navigating, by the first autonomous aerial vehicle, within the physical space using the first motor according to a first granted time utilization and a first granted navigation utilization; and (f1) navigating, by the second autonomous aerial vehicle, within the physical space using the second motor according to a second granted time utilization and a second granted navigation utilization.

50. The system of claim 46, wherein the first granted utilization comprises a manner in which the resource can be handled, manipulated, or altered for the first autonomous aerial vehicle to perform the first task or by the first autonomous aerial vehicle in performing the first task.

51. The system of claim 46, wherein the first requested utilization is different from the first granted utilization.

* * * * *